(12) United States Patent
Hwang et al.

(10) Patent No.: US 10,284,255 B1
(45) Date of Patent: May 7, 2019

(54) BASE STATION AND METHOD FOR OPERATING THE BASE STATION

(71) Applicant: INSTITUTE FOR INFORMATION INDUSTRY, Taipei (TW)

(72) Inventors: Jeng-Kuang Hwang, Taoyuan (TW); Cheng-Feng Li, Yilan County (TW); Chin-Gwo Ma, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 15/807,590

(22) Filed: Nov. 9, 2017

(30) Foreign Application Priority Data

Nov. 3, 2017 (TW) .............................. 106138179 A (51) Int. Cl.
*H04B 1/713* (2011.01)
*H04W 28/04* (2009.01)
*H04L 27/26* (2006.01)

(52) U.S. Cl.
CPC ......... *H04B 1/713* (2013.01); *H04L 27/2647* (2013.01); *H04W 28/04* (2013.01)

(58) Field of Classification Search
USPC ....................................................... 375/130
See application file for complete search history.

(56) References Cited

U.S. PATENT DOCUMENTS

| | | | |
|---|---|---|---|
| 9,319,893 B2 * | 4/2016 | Zhang | H04W 24/00 |
| 2003/0097595 A1 * | 5/2003 | Partridge | H04L 63/1408 |
| | | | 726/4 |
| 2004/0077349 A1 | 4/2004 | Barak et al. | |
| 2006/0274868 A1 | 12/2006 | Chen et al. | |
| 2007/0058693 A1 * | 3/2007 | Aytur | H04B 1/713 |
| | | | 375/130 |
| 2010/0080312 A1 | 4/2010 | Moffatt et al. | |
| 2017/0105127 A1 | 4/2017 | Xiong et al. | |
| 2017/0265223 A1 * | 9/2017 | Zhang | H04W 74/085 |
| 2018/0120961 A1 * | 5/2018 | Liang | G06F 3/03545 |

OTHER PUBLICATIONS

Xingqin Lin et al., "Random Access Preamble Design and Detection for 3GPP Narrowband IoT Systems", No. 6, vol. 5, IEEE Wireless communications Letters, Dec. 2016.
The office action of the corresponding Taiwanese application dated Jul. 20, 2018.

* cited by examiner

*Primary Examiner* — Eva Y Puente
(74) *Attorney, Agent, or Firm* — CKC & Partners Co., LLC (57) ABSTRACT

Present disclosure relates to a base station and a method for operating the same. The base station includes a communicating unit and a processing unit. The communicating unit is wirelessly connected to user equipments in the internet of things. The communicating unit is configured to receive a frequency hopping preamble sequence from a user equipment. The processing unit, electrically coupled to the communicating unit, is configured to obtain frequency hopping energies corresponding to a plurality of symbol groups from the frequency hopping preamble sequence. The processing unit is configured to accumulate the frequency hopping energies and calculate an average energy corresponding to one symbol group according to the accumulated frequency hopping energies. The processing unit is configured to calculate a threshold based on the average energy and a false alarm rate, wherein the threshold is applied to determine whether signals sending from the user equipment are noises.

18 Claims, 5 Drawing Sheets

BASE STATION AND METHOD FOR OPERATING THE BASE STATION

CROSS-REFERENCE TO RELATED APPLICATION

This application claims priority to Taiwan Application Serial Number 106138179, filed on Nov. 3, 2017, which is herein incorporated by reference.

BACKGROUND

Field of Invention

Present disclosure relates to a base station and a method for operating the base station. More particularly, the present disclosure relates to a base station and a method for operating the base station in a network of internet of things.

Description of Related Art

Narrow band internet of things (NB-IoT) is a new project developed from the third generation partnership project (3GPP). There are several characteristic can be found on user equipment (UE) in a network of NB-IoT, such as less power consumption, longer signal transmitting range, and longer signal delay.

However, in the standard of narrow band internet of things, there is a requirement that the base station should receive signals from UE with specific false alarm rate ($P_{fa}$) and specific detection rate ($P_d$). To people in the art, it is difficult to find a balance between the length of frequency hopping preamble sequence and the detection threshold, and said problem has still not been resolve.

SUMMARY

The disclosure relates to a base station, which is applied on a network of internet of things. The system comprises a communicating unit, and a processing unit. The communicating unit is in communication with a user equipment in the network, and the communicating unit is configured to receive a frequency hopping preamble sequence from the user equipment. The processing unit is electrically coupled to the communicating unit. The processing unit is configured to obtain frequency hopping energies corresponding to N symbol groups from the frequency hopping preamble sequence, and to accumulate the frequency hopping energies, and to calculate an average energy corresponding to one symbol group according to the accumulated frequency hopping energies. The processing unit is further configured to calculate a threshold based on the average energy and a false alarm rate, wherein the threshold is applied to determine whether signals sending from the user equipment are noises.

Another aspect of present disclosure is to provide a method for operating a base station, wherein the method is applied on a network of internet of things. The method comprises following steps: receiving a frequency hopping preamble sequence from a user equipment in the network by a communicating unit; receiving a frequency hopping preamble sequence from a user equipment in the network by a communicating unit. The method further comprises following steps: accumulating, by the processing unit, the frequency hopping energies to calculate an average energy corresponding to one symbol group according to the accumulated frequency hopping energies; and calculating a threshold based on the average energy and a false alarm rate by the processing unit, wherein the threshold is applied to determine whether signals sending from the user equipment are noises.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1:
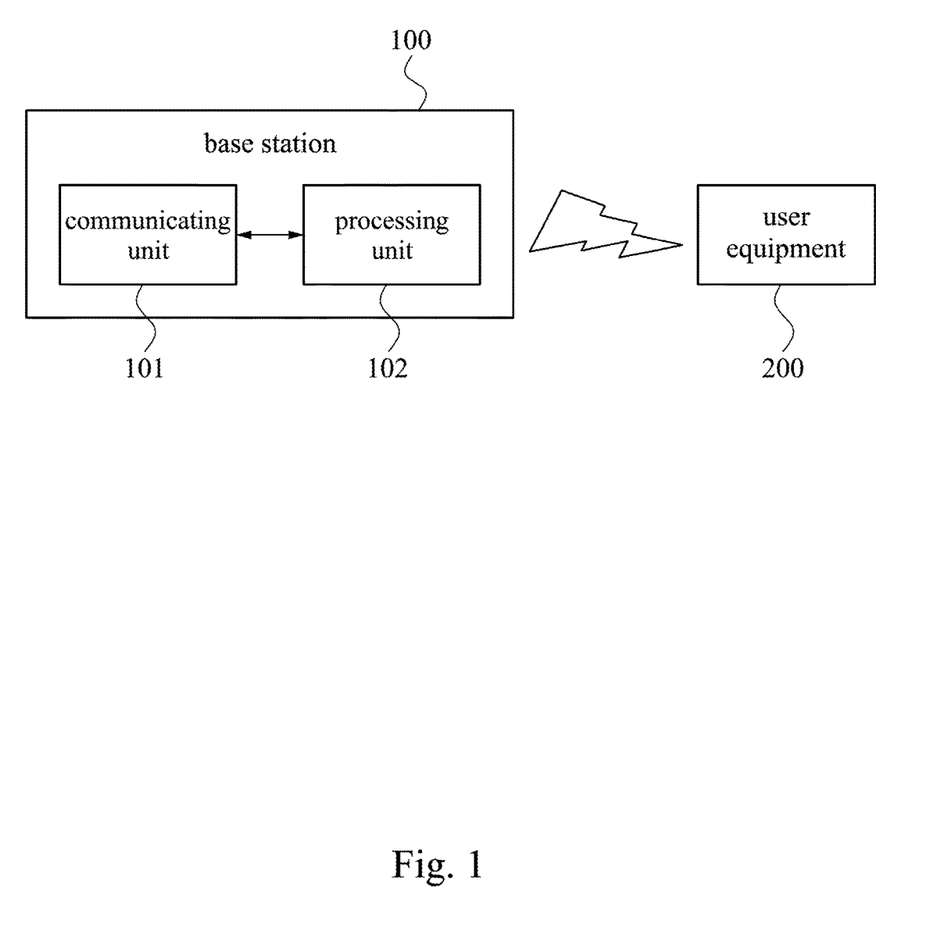
FIG. 1 is a schematic diagram of a base station of an embodiment of present disclosure.

FIG. 1 is a schematic diagram of a base station of an embodiment of present disclosure. As shown in FIG. 1, in the embodiment, a base station 100 comprises a communicating unit 101 and a processing unit 102, wherein the communicating unit 101 and the processing unit 102 are electrically coupled. The communicating unit 101 is in communication with user equipment 200 via a network of internet of things. In the narrow band internet of things (NB-IoT), before the user equipment 200 builds connection with the base station 100, the user equipment 200 may execute a random access procedure to send a NPRACH (narrowband physical random access channel) signal to the base station 100. Wherein the NPRACH signal includes a frequency hopping preamble sequence, and the length of the frequency hopping preamble sequence is N. In general, the value of N can be one of the numbers in the following union, in which the union is represented as {4, 8, 16, 32, 64, 128, 256, 512}. The communicating unit 101 of the base station 100 is configured to receive the frequency hopping preamble sequence from the user equipment 200 and send the frequency hopping preamble sequence to the processing unit 102, wherein the preamble sequence is processed by the processing unit 102.

In the embodiment, the processing unit 102 of the base station 100 will send system information block (SIB) information to the user equipment 200 in response to the NPRACH signal from the user equipment 200. In the system information block information, the processing unit 102 will set a length of the frequency hopping preamble sequence for the user equipment 200. Moreover, the processing unit 102 of the base station 100 is also configured to set a threshold, wherein the threshold is settled to determine whether following NPRACH signals sent from the user equipment 200 are noises. However, in the standard of the narrow band internet of things, when the base stations are going to determine the NPRACH signals, the determination requires to be built on two regulated values, which are a false alarm rate ($P_{fa}$) and a detection rate ($P_d$). As such, based on the false alarm rate and the detection rate, the base station 100 of the embodiment may set the threshold for determining the NPRACH signals properly. In the standard of the narrow band internet of things, the false alarm rate to incorrectly determine the NPRACH signals should be less than 0.01% ($P_{fa}(\alpha)<0.01\%$), and the detection rate to successfully determine the NPRACH signals should be higher than 0.99% ($Pd(\beta)>0.99\%$).

As mentioned above, when the processing unit 102 of the base station 100 receives the frequency hopping preamble sequence from the communicating unit 101, the processing unit 102 may process the frequency hopping preamble sequence with a FFT (Fast Fourier Transform) procedure. The frequency hopping preamble sequence, length as N, processed by the FFT procedure becomes N symbol groups of post-FFT digits, wherein each post-FFT digit has an index value indicating a frequency hopping energy of it. The processing unit 102 may accumulate the frequency hopping energies of these N symbol groups of post-FFT digits, and calculate an average energy corresponding to one symbol group according to the accumulated frequency hopping energies.

Figure 2:
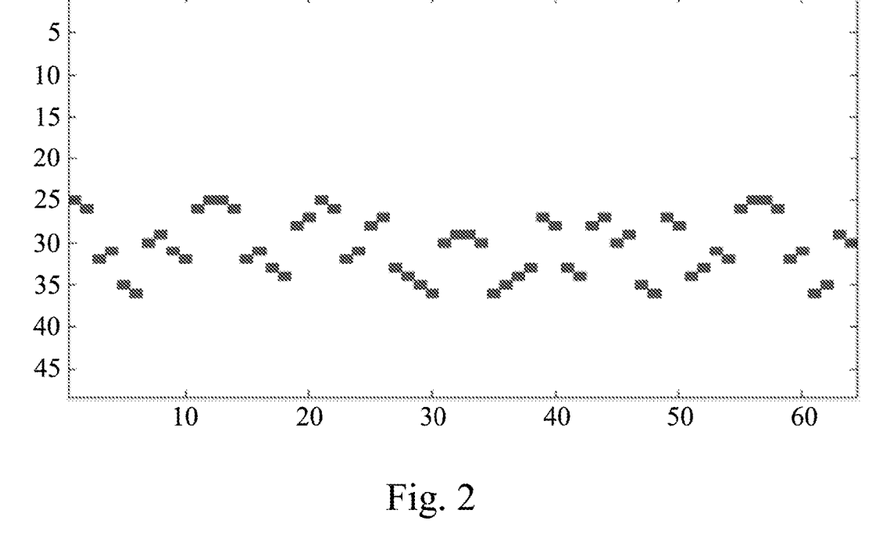
FIG. 2 is a schematic diagram of post-FFT digits of an embodiment of present disclosure.

FIG. 2 is a schematic diagram of post-FFT digits of an embodiment of present disclosure. As shown in FIG. 2, the horizontal axis shows the values of N. Along the horizontal axis, the value of N increases from the left to the right. The value of N is the numbers of the collected symbol groups. The vertical axis in the figure shows the index values of the frequency hopping energies, wherein the value of the index decreases from the top to the bottom. According to the figure, the frequency hopping preamble sequence of the NPRACH signals from the user equipment 200 may represent different index values when the value of N changes. The processing unit 102 may accumulate the frequency hopping energies of these N symbol groups of post-FFT digits shown in the figure, and calculate the average energy corresponding to one symbol group according to the accumulated frequency hopping energies.

In the embodiment, when the processing unit 102 generates the average energy corresponding to one symbol group, the processing unit 102 may process a threshold algorithm, wherein the threshold algorithm builds on Neyman Pearson Lemma, and the average energy and the false alarm rate ($P_{fa}$) are inputs of the threshold algorithm. In one embodiment, the mathematical sentence of the threshold algorithm is shown as follows.

$$\lambda_o = \frac{1}{\kappa} F_N^{-1}(1-\alpha, 10N)$$

Wherein $\lambda_o$ is the value of the threshold, and wherein the value of $\kappa$ is calculated with following mathematical sentence.

$$\kappa = (10N)/(L\sigma_n^2)$$

Wherein value N is the numbers of the collected symbol groups. The value of $\kappa$ can be calculated by: firstly, multiply N with ten to gain a first value; secondly, multiply preamble sequence length L by the variance of the accumulated frequency hopping energies of the N symbol groups to gain a second value; thirdly, divide the first value by the second value. In the threshold algorithm, $F^{-1}$ indicates that the function is an anti-function built on N-P Lemma, and the value of $(1-\alpha)$ and the value of 10N are inputs of the anti-function, wherein $\alpha$ is the value of the false alarm rate. According to the threshold algorithm, the value of $\lambda_o$ can be generated by inputting the value of $(1-\alpha)$ and the value of 10N to the anti-function $F^{-1}$.

In the embodiment, when the processing unit 102 generates the threshold, the processing unit 102 may determine whether the NPRACH signals sent from the user equipment 200 are noises. When accumulated frequency hopping energies in the NPRACH signals exceeds the threshold, the processing unit 102 may determine that the NPRACH signals from the user equipment 200 are not noises.

Therefore, according to aforementioned embodiments, a base station provided by present disclosure may dynamically adjust the threshold by accumulating frequency hopping energies from the frequency hopping preamble sequence, which is an effect that the prior arts cannot achieve.

In the embodiment, when the processing unit 102 generates the threshold according to above steps, the processing unit 102 may continue to build a first lookup table according to the value of N and a power of noise value ($P_n$), wherein the power of noise value is a known value. The first lookup table is a record of correlations between value of N and the threshold, wherein multiple lookup values are stored in the first lookup table, and the lookup values represents how different N map to corresponding thresholds. Given the false alarm rate, to calculate the lookup value, we should divide the threshold tied to N by the given power of noise value. Shown in the following is the definition sentence of the first lookup table.

$$\eta_0(N) \triangleq \frac{\lambda_0(N, \alpha, P_n)}{P_n}$$

In the definition sentence, value N is the numbers of the collected symbol groups. The lookup value is represented as $\eta_{0(N)}$, wherein the $\lambda_0$ is the threshold and $\alpha$ is the false alarm rate.

Figure 3:
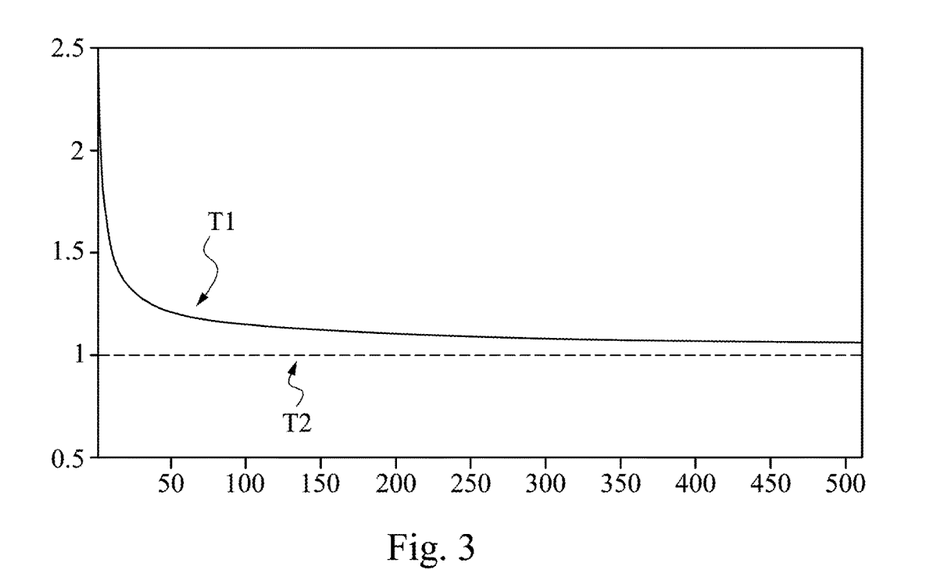
FIG. 3 is a schematic diagram of a first lookup table of an embodiment of present disclosure.

FIG. 3 is a schematic diagram of a first lookup table of an embodiment of present disclosure. As shown in FIG. 3, the horizontal axis shows the values of N, wherein the value of N is increasing along the horizontal axis. The value of N is the numbers of the collected symbol groups. The vertical axis in the figure shows the values of the lookup value, in which each of the lookup values represents ratio of a threshold and given power of noise value. The curve T1 is a curve shows the trend of value N, and the curve T2 is a curve shows the trend of the power of noise value. According to the figure, when the value of N increases, the value of the lookup value decreases dramatically. The drop of the lookup value becomes smooth when the value of N grows over 50, and the curve T1 keeps decreasing to approach the curve T2 of the power of noise value. The figure shows that the processing unit 102 may get a threshold approaching to the power of noise when the value of N increases, and the trend indicates that the rate for successfully determining the NPRACH signals grows according to the accumulation of frequency hopping energies.

In one embodiment, the processing unit 102 of the base station 100 may run a Monte Carlo simulation with the first lookup table and channel attributes to build a second lookup table. The second lookup table records a signal to noise ratio (SNR) value corresponding to a detection rate, and wherein the detection rate is set corresponding to the value of N. As mentioned above, in the standard of the narrow band internet of things, the detection rate for the base station 100 to determine the NPRACH signals correctly should be set higher than 0.99%. Therefore, lookup values in the second lookup table represent the SNR values corresponding to different N value when the detection rate is higher than 0.99%.

Figure 4:
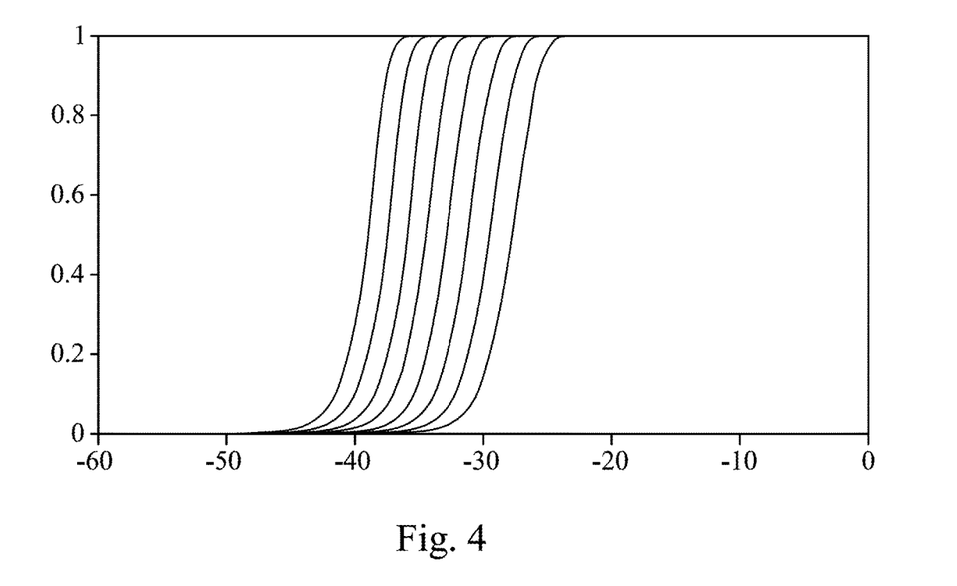
FIG. 4 is a schematic diagram of a second lookup table of an embodiment of present disclosure.

FIG. 4 is a schematic diagram of a second lookup table of an embodiment of present disclosure. In the embodiment, the processing unit 102 may process the Monte Carlo simulation according to the first lookup table shown in the embodiment of FIG. 3, and shown in FIG. 4 is the result of the Monte Carlo simulation. Channel attributes imported in the embodiment are the channel attributes of an additive white Gaussian noise (AWGN), wherein the horizontal axis shows the values of the signal to noise ratio (SNR) and the signal to noise ratio is represented in decibel (dB). The value of the signal to noise ratio is increasing from the left to the right along the horizontal axis. The vertical axis in the figure shows the values of the detection rate, in which the detection rate is increasing along the vertical axis. In the embodiment, the detection rate represents the rate for successfully detecting the NPRACH signal. Multiple curves are shown in the figure, wherein each of the curves shows the simulation result when N equals to 512, 256, 128, 64, 32, 16, 8, and 4, respectively, along the horizontal axis. According to the figure, when observing under a fixed signal to noise ratio, the detection rate becomes higher when the value of N increases; and, when observing under a detection rate, the signal to noise ratio becomes higher when the value of N increases. In the standard of the narrow band internet of things, people usually concern about the correlations between the N values and the signal to noise ratios when the detection rate is fixed.

Figure 5:
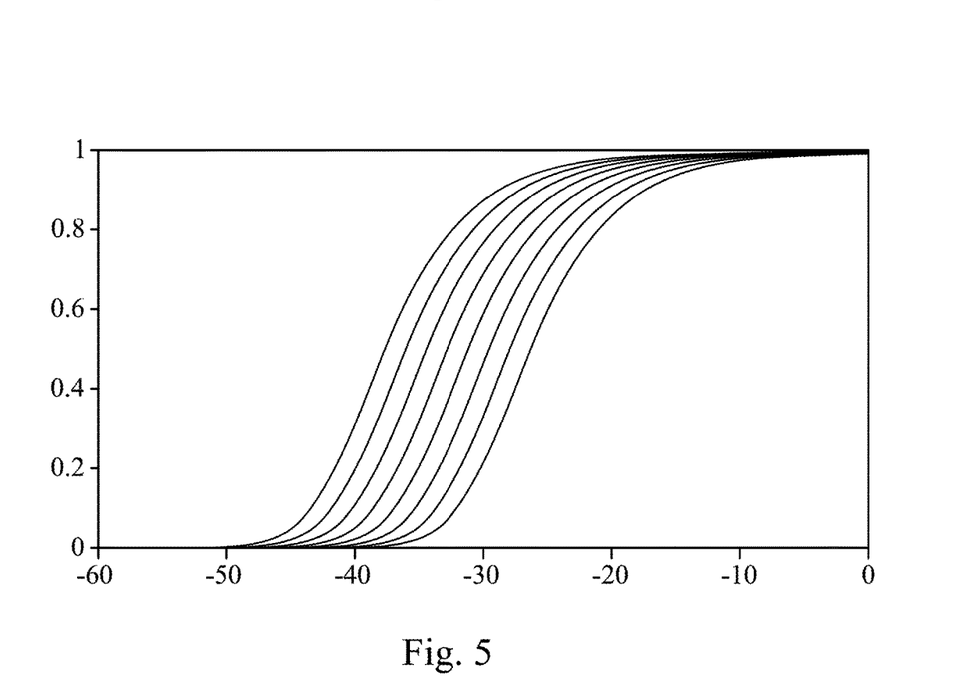
FIG. 5 is a schematic diagram of a second lookup table of an embodiment of present disclosure.

FIG. 5 is a schematic diagram of a second lookup table of an embodiment of present disclosure. In the embodiment, the processing unit 102 may process the Monte Carlo simulation according to the first lookup table shown in the embodiment of FIG. 3, and shown in FIG. 5 is the result of the Monte Carlo simulation. Channel attributes imported in the embodiment are the channel attributes of a Rayleigh fading channel. In the figure, as same as FIG. 4, the horizontal axis shows the values of the signal to noise ratio (SNR) and the signal to noise ratio is represented in decibel (dB). The value of the signal to noise ratio is increasing from the left to the right along the horizontal axis. The vertical axis in the figure shows the values of the detection rate, in which the detection rate is increasing along the vertical axis. In the embodiment, the detection rate represents the rate for successfully detecting the NPRACH signal. Multiple curves are illustrated in the figure, wherein each of the curves shows the simulation result when N equals to 512, 256, 128, 64, 32, 16, 8, and 4, respectively, along the horizontal axis. According to the figure, when observing under a fixed signal to noise ratio, the detection rate becomes higher when the value of N increases; and, when observing under a detection rate, the signal to noise ratio becomes higher when the value of N increases. The result of the simulation is substantially similar to the embodiment of FIG. 4; however, in the result using Rayleigh fading channel, it is apparent that the slopes of the curves shown in FIG. 5 are smaller than the slopes of the curves shown in FIG. 4. Moreover, each curve shown in FIG. 5 covers wider ranges of SNR than the curves shown in FIG. 4. In the same manner, in the standard of the narrow band internet of things, people usually concern about the correlations between the N values and the signal to noise ratios when the detection rate is fixed.

In one embodiment, the processing unit 102 of the base station 100 may generate an adjusted SNR value by calculating the SNR value with a plurality of environmental parameters. In the embodiment, the environmental parameters are referring to the influence of the bandwidth of the user equipment, CL pass loss of the signal energies, and thermal noise. In the embodiment, the following mathematical sentence is provided to find out the influence of the bandwidth of the user equipment.

$$P_{rxnoise} = N_0 + 10 \log_{10}(B_T)$$

In above mathematical sentence, $P_{rxnoise}$ is the value indicating the influence of the bandwidth of the user equipment, $N_0$ is a noise constant, and $B_T$ is the bandwidth of the user equipment. In the embodiment, the following mathematical sentence is provided to generate the CL pass loss of the signal energies.

$$PL = PL_b - 10 \cdot PL_n \cdot \log 10(D)$$

In above mathematical sentence, PL is the value indicating the pass loss and $PL_b$ is a coupling loss constant, which is represented in km/dB. In the sentence, $PL_n$ is the accumulated coupling loss when the length of the frequency hopping preamble sequence is N. In the sentence, D is the value indicating the range of signal coverage, which is represented in kilometers. In the embodiment, when the processing unit 102 generates the value of the influence of the bandwidth of the user equipment, the processing unit 102 may retrieve the thermal noise. The processing unit 102 may further deduct the value of the influence of the bandwidth of the user equipment from the accumulated coupling loss, and get the result of the adjusted SNR value. In the embodiment, the following mathematical sentence is provided to represent the calculation of the adjusted SNR value.

$$SNR_{rx} = P_{rxsig} - P_{rxnoise}$$

In above mathematical sentence, $SNR_{rx}$ is the adjusted SNR value. $P_{rxsig}$ is the value indicating the accumulated coupling loss, and $P_{rxnoise}$ is the value indicating the influence of the bandwidth of the user equipment.

In one embodiment, when the processing unit 102 of the base station gets the adjusted SNR value, the processing unit 102 may search the adjusted SNR in the first lookup table and the second lookup table. The search is provided to determine a length of the frequency hopping preamble sequence corresponding to specific signal coverage of the base station 100. As mentioned, in the standard of the narrow band internet of things, the processing unit 102 of the base station is configured to lookup a value of N corresponding to the adjusted SNR when the detection rate ($P_d$) is higher than 0.99%. As such, in the embodiment of present disclosure, the base station 100 may determine the length of the frequency hopping preamble sequence (value of N) when given with fixed conditions.

To get a better understanding of the aforementioned embodiments, the values of embodiments in FIG. 4 and FIG. 5 are listed in following first table. The values being listed are the SNR values when N={4, 8, 16, 32, 64, 128, 256, 512}, further on condition that the channel attributes of AWGN and Rayleigh fading channel are imported, respectively. It should be understood that the values in the first table are actually the numerical contents shown in the second lookup table. Moreover, the first list further shows the signal coverages in these two simulations, wherein the signal coverages are the ranges that the signals may cover when the value of N equals to mentioned values, and wherein the signal coverages are represented in kilometers. For instance, according to the first list, it can be seen that the SNR value is −24.3 dB when N equals to four in the AWGN channel simulation; in the case, the signal coverage is 45 km. According to the first list, it can be seen that the SNR value is −7.8 dB when N equals to four in the Rayleigh fading channel simulation; in the case, the signal coverage is 17 km. Apparently, whenever it is the AWGN channel simulation or the Rayleigh fading channel simulation, when the value of N grows, the SNR value grows as well, and so does the signal coverage.

The first table is shown below.

| Channel | N | | | | | | | |
|---|---|---|---|---|---|---|---|---|
| | 4 | 8 | 16 | 32 | 64 | 128 | 256 | 512 |
| AWGN | −24.3 | −26.1 | −28.1 | −30 | −31.3 | −33.1 | −35 | −36.4 |
| D(km) | 45 | 50 | 58 | 65 | 71 | 78 | 86 | 95 |
| Rayleigh | −7.8 | −9.2 | −11 | −12.9 | −14.2 | −16 | −17.2 | −19 |
| D(km) | 17 | 19 | 22 | 24 | 26 | 29 | 31 | 35 |

In the embodiment, when the processing unit 102 of the base station 100 builds the second lookup table, the processing unit 102 may determine the length of the frequency hopping preamble sequence (value of N) according to a given SNR value, and the base station 100 may cover a given signal coverage correspondingly. Moreover, the setting of the length of the frequency hopping preamble sequence should be satisfactory to the detection rate and the false alarm rate required by the standard of the narrow band internet of things. Furthermore, when the length of the frequency hopping preamble sequence (value of N) is settled, the processing unit 102 of the base station 100 may determine the threshold according to the value of N.

In the embodiment, when the processing unit 102 of the base station 100 determines the value of N, the processing unit 102 may add the length of the frequency hopping preamble sequence to the SIB in response to the user equipment 200, wherein the SIB may be sent to the user equipment 200 via the communicating unit 101. The user equipment 200 will generate the NPRACH signals according to the length of the frequency hopping preamble sequence afterwards. In the other end, the processing unit 102 may apply the threshold to detect the NPRACH signals from the user equipment 200.

Figure 6:
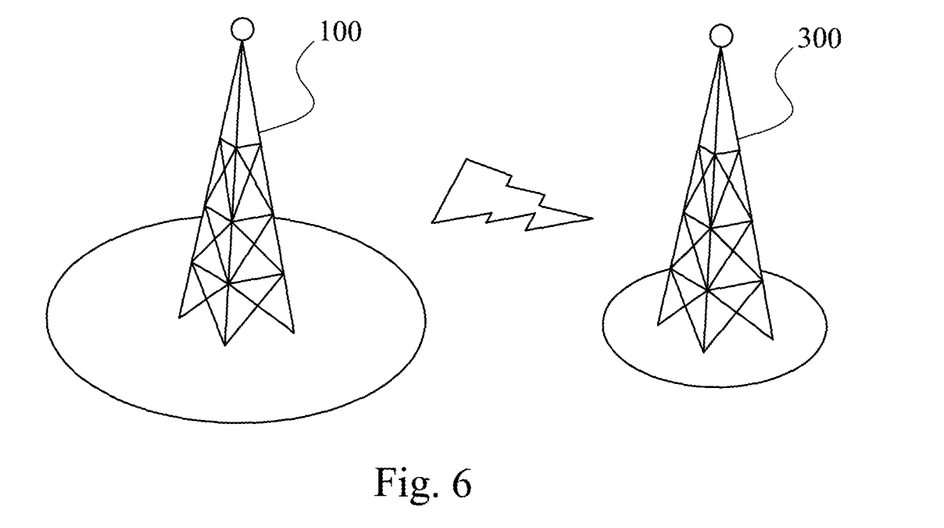
FIG. 6 is a schematic diagram of a base station of an embodiment of present disclosure.
Figure 7:
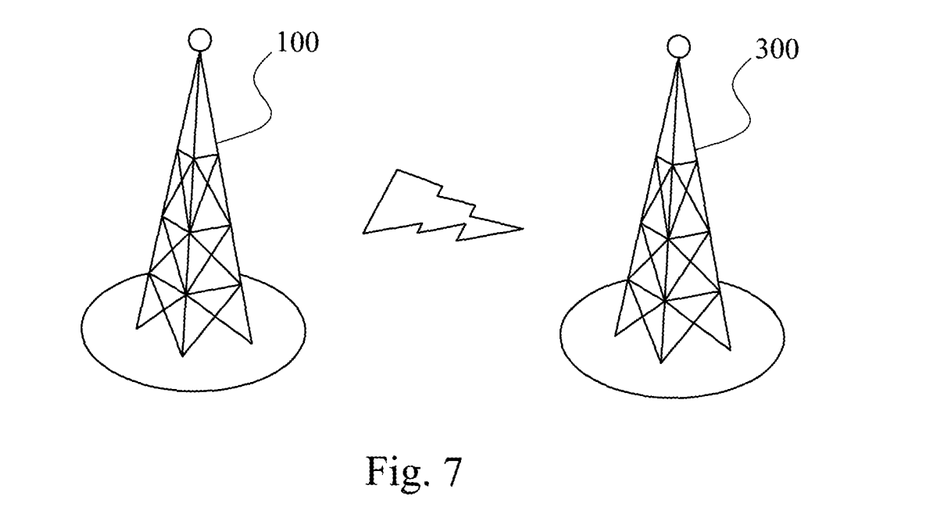
FIG. 7 is a schematic diagram of a base station of an embodiment of present disclosure.

References are made to FIG. 6 and FIG. 7, wherein these two figures are both schematic diagrams of a base station of an embodiment of present disclosure. As shown in FIG. 6, in one embodiment, the configuration details of the base station 100 is shown in FIG. 1. In the embodiment, when the base station 100 is connected to a number of user equipments that exceeds a workload limit, the processing unit 102 of the base station 100 may communicate to a base station 300 via the communicating unit 101, wherein the base station 300 is a base station adjacent to the base station 100. After the connection between the base station 100 and the base station 300 is built, the processing unit 102 may decrease the length of the frequency hopping preamble sequence; therefore, the signal coverage of the base station 100 shrinks. As a result, the number of the user equipment 200 connected to the base station 100 may be reduced, as shown in FIG. 6. Furthermore, the reference is made to FIG. 7, in the embodiment, since the base station 100 is in communication with the base station 300, the processing unit 102 of the base station 100 may control the base station 300 to increase its length of frequency hopping preamble sequence. As a result, the signal coverage of the base station 300 may be extended, and those user equipments disconnected from the base station 100 may reconnect to the base station 300.

More specifically, in the embodiment, when the base station 100 carries too much user equipments that it can bear, the processing unit 102 of the base station 100 may initiate a communicate with the base station 300 via the communicating unit 101. As shown in the above embodiment and the first stable, the processing unit 102 has built the second lookup table, and the second lookup table stores the correlation between the N value and the signal coverage when different channel attributes are imported. Therefore, the processing unit 102 may calculate the range of the signal coverage tied to N value according to the second lookup table. Since the processing unit 102 has obtained the ranges of the signal coverage, the processing unit 102 may calculate how many user equipments would be disconnected from the processing unit 102 when the range of the signal coverage is changing.

For instance, in one embodiment, when the processing unit 102 of the base station 100 reduce the length of frequency hopping preamble sequence (N value) from 64 to 32, when considering a Rayleigh fading channel simulation, the signal coverage of the base station 100 would be reduced by 2 kilometers. Considering the signal coverage as a circle, the signal coverage would be around 15% smaller than it is before the adjustment. If the number of the connected user equipments follows the uniform distribution, the act that the processing unit 102 reduces the length of frequency hopping preamble sequence from 64 to 32 may decrease the connection of the user equipments for about 15%. Afterwards, the processing unit 102 of the base station 100 may control the base station 300 to increase its length of frequency hopping preamble sequence. As such, the signal coverage of the base station 300 may be extended to cover the 15% of user equipments disconnected from the base station 100. It is to say, the embodiment of present disclosure provides an approach to lower the workload of a base station. When the base station bears a heavy workload, the base station may coordinate with an adjacent base station to share some workloads.

Figure 8:
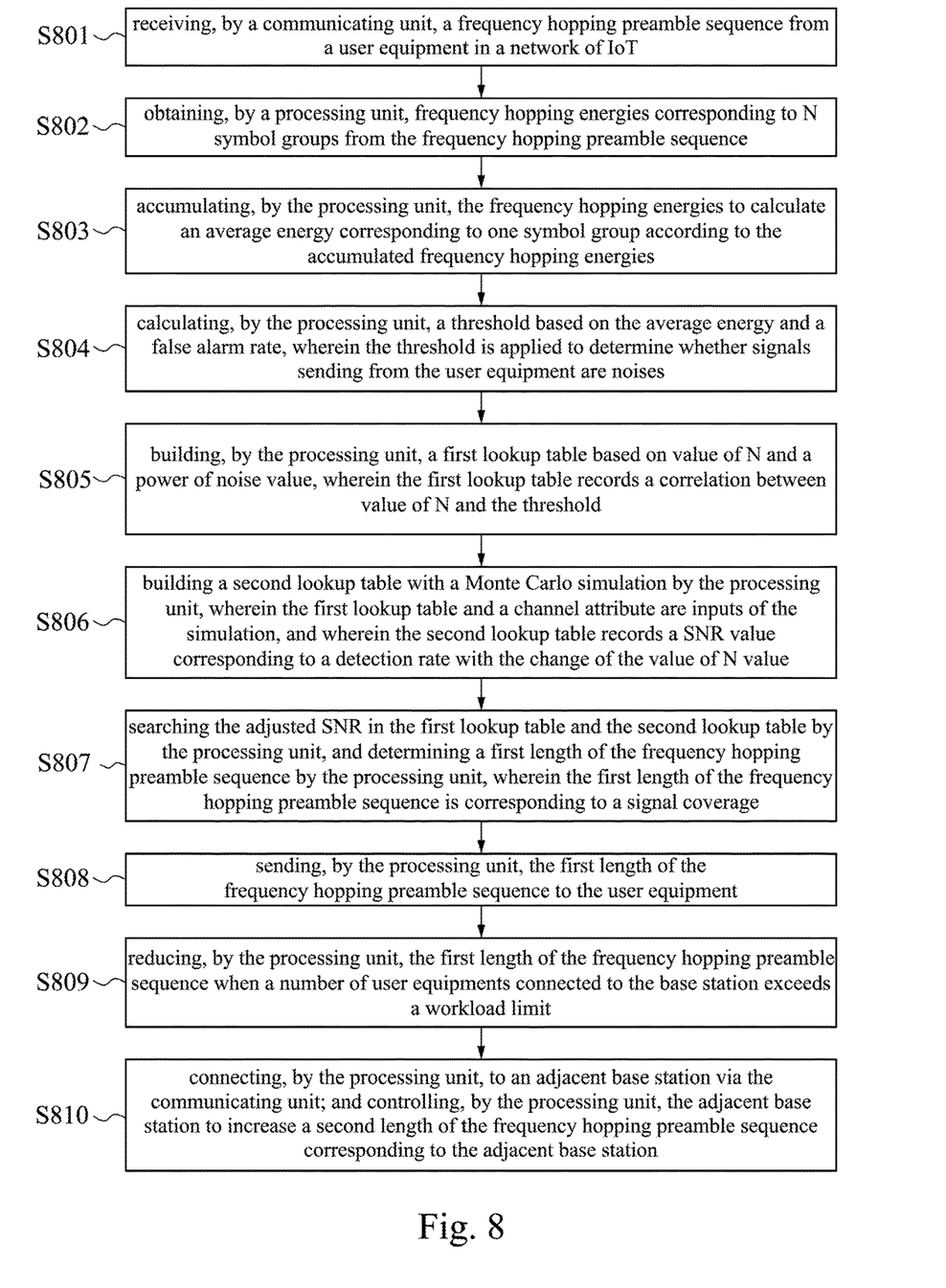
FIG. 8 is a flow chart of a method for operating a base station according to some embodiments of present disclosure.

FIG. 8 is a flow chart of a method for operating a base station according to some embodiments of present disclosure. In the embodiment, the operating method is applied to the base station 100 described in foregoing embodiments. Regarding the base station 100, the references can be made to FIGS. 1-7. The steps of the method will be listed and explained in detail in following segments.

Step S801: receiving, by a communicating unit, a frequency hopping preamble sequence from a user equipment in a network of IoT. As shown in FIG. 1, in an embodiment, when the user equipment 200 initiates a connection with the base station 100, the user equipment 200 sends a NPRACH signal, wherein the NPRACH signal includes a frequency hopping preamble sequence, and the length of the frequency hopping preamble sequence is N. The communicating unit 101 of the base station 100 is configured to receive the frequency hopping preamble sequence from the user equipment 200 and send the frequency hopping preamble sequence to the processing unit 102.

Step S802: obtaining, by a processing unit, frequency hopping energies corresponding to N symbol groups from the frequency hopping preamble sequence. As shown in FIG. 1 and FIG. 2, in an embodiment, when the processing unit 102 of the base station 100 receives the frequency hopping preamble sequence, the processing unit 102 may process the frequency hopping preamble sequence with a Fast Fourier Transform procedure. The frequency hopping preamble sequence, length as N, processed by the FFT procedure becomes N symbol groups of post-FFT digits, wherein each post-FFT digit has an index value indicating a frequency hopping energy of it.

Step S803: accumulating, by the processing unit, the frequency hopping energies to calculate an average energy corresponding to one symbol group according to the accumulated frequency hopping energies. After step S802, as shown in FIG. 1 and FIG. 2, the processing unit 102 may accumulate the frequency hopping energies of these N symbol groups of post-FFT digits, and calculate the average energy corresponding to one symbol group according to the accumulated frequency hopping energies.

Step S804: calculating, by the processing unit, a threshold based on the average energy and a false alarm rate, wherein the threshold is applied to determine whether signals sending from the user equipment are noises. As shown in FIG. 1 and FIG. 2, when the processing unit 102 generates the average energy corresponding to one symbol group, the processing unit 102 may process the threshold algorithm, wherein the average energy and the false alarm rate ($P_{fa}$) are inputs of the threshold algorithm. Since the details of the threshold algorithm have been described in foregoing embodiment, they will not be repeated here. In the embodiment, when the processing unit 102 generates the threshold, the processing unit 102 may determine whether the NPRACH signals sent from the user equipment 200 are noises. When accumulated frequency hopping energies in the NPRACH signals exceeds the threshold, the processing unit 102 may determine that the NPRACH signals from the user equipment 200 are not noises.

Step S805 building, by the processing unit, a first lookup table based on value of N and a power of noise value, wherein the first lookup table records a correlation between value of N and the threshold. As shown in FIG. 1 to FIG. 3, in the embodiment, when the processing unit 102 generates the threshold according to above steps, the processing unit 102 may continue to build a first lookup table according to the value of N and a power of noise value (Pn), wherein the power of noise value is a known value. The first lookup table is a record of correlations between value of N and the threshold, wherein multiple lookup values are stored in the first lookup table, and the lookup values represents how different N map to corresponding thresholds. The steps to calculate the lookup values can be found in aforementioned embodiment, they will not be repeated here.

Step S806 building a second lookup table with a Monte Carlo simulation by the processing unit, wherein the first lookup table and a channel attribute are inputs of the simulation, and wherein the second lookup table records a SNR value corresponding to a detection rate with the change of the value of N value. As shown in FIGS. 1, 4, and 5, in one embodiment, the processing unit 102 of the base station 100 may run the Monte Carlo simulation with the first lookup table and channel attributes to build the second lookup table. The second lookup table records the signal to noise ratio (SNR) value corresponding to a detection rate, and wherein the detection rate is set corresponding to the value of N. The steps to build the second lookup table and simulation results can be found in aforementioned embodiments, they will not be repeated here.

Step S807 searching the adjusted SNR in the first lookup table and the second lookup table by the processing unit, and determining a first length of the frequency hopping preamble sequence by the processing unit, wherein the first length of the frequency hopping preamble sequence is corresponding to a signal coverage. As shown in the embodiments of FIG. 1, FIG. 4, FIG. 5, and the first table. In some embodiments, the processing unit 102 of the base station 100 may generate the adjusted SNR value by calculating the SNR value with a plurality of environmental parameters. In the embodiment, the environmental parameters are referring to the influence of the bandwidth of the user equipment, CL pass loss of the signal energies, and thermal noise. The steps to calculate the adjusted SNR value can be found in aforementioned embodiments, they will not be repeated here. Moreover, in the embodiments, when the processing unit 102 of the base station gets the adjusted SNR value, the processing unit 102 may search the adjusted SNR in the first lookup table and the second lookup table. The search is provided to determine the length of the frequency hopping preamble sequence corresponding to specific signal coverage of the base station 100. As mentioned, in the standard of the narrow band internet of things, the processing unit 102 of the base station is configured to lookup the value of N corresponding to the adjusted SNR when the detection rate ($P_d$) is higher than 0.99%.

Step S808 sending, by the processing unit, the first length of the frequency hopping preamble sequence to the user equipment. As shown in the embodiments of FIG. 1 to FIG. 5, in some embodiments, when the processing unit 102 of the base station 100 determines the length of the frequency hopping preamble sequence, the processing unit 102 may add the length of the frequency hopping preamble sequence to the SIB in response to the user equipment 200. The SIB may be sent to the user equipment 200 via the communicating unit 101. As such, the user equipment 200 may generate the NPRACH signals according to the length of the frequency hopping preamble sequence afterwards.

Step S809 reducing, by the processing unit, the first length of the frequency hopping preamble sequence when a number of user equipments connected to the base station exceeds a workload limit. As shown in the embodiments of FIG. 1, FIG. 6, FIG. 7 and the first table, when the workload of the base station 100 is heavy, the processing unit 102 of the base station 100 may communicate to a base station 300 adjacent to the base station 100 via the communicating unit 101. According to the second lookup table, the processing unit 102 may calculate the range of the signal coverage tied to N, and calculate how many user equipments would be disconnected from the processing unit 102 when the range of the signal coverage is changing. As such, the processing unit 102 may determine to set the length of frequency hopping preamble sequence based on needs.

Step S810 connecting, by the processing unit, to an adjacent base station via the communicating unit; and controlling, by the processing unit, the adjacent base station to increase a second length of the frequency hopping preamble sequence corresponding to the adjacent base station. After step S809, in the embodiment, since the processing unit 102 of the base station 100 is in communication with the adjacent base station 300, the processing unit 102 may control the base station 300 to increase its length of frequency hopping preamble sequence. As such, the signal coverage of the base station 300 may be extended to cover the user equipments disconnected from the base station 100 so that the base station 300 may share workloads with the base station 100.

Moreover, after steps S809 and S810, the base station 100 and the base station 300 may execute step S808 to add the lengths of the frequency hopping preamble sequence to the SIBs in response to those user equipments, respectively.

From all aforementioned embodiments, it can be seen that present disclosure provides a base station with several advantages, wherein the advantages are listed as follows. Present disclosure provides embodiments of a base station and a method for operating the same, wherein the base station and the method provide solutions for balancing the determinations for the length of the frequency hopping preamble sequence and the threshold. Present disclosure also provides an approach to build several lookup tables regarding to the length of the frequency hopping preamble sequence. By utilizing information in these lookup tables, the base station of present disclosure may dynamically adjust the length of the frequency hopping preamble sequence as taking the influences of channels or noises into consideration. As such, the base station of present disclosure can be satisfactory to the requirements of the standard of the narrow band internet of things. Moreover, the embodiments of present disclosure also provide a base station that can coordinate with adjacent base stations to share workloads. In general, these embodiments provided by present disclosure overcome many problems that cannot be resolved by prior arts.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A base station, applied on a network of Internet of Things, comprising:
a communicating element, in communication with a user equipment in the network, configured to receive a frequency hopping preamble sequence from the user equipment; and
a processor, electrically coupled to the communicating element, configured to obtain frequency hopping energies corresponding to N symbol groups from the frequency hopping preamble sequence, wherein N is a length of the frequency hopping preamble sequence, the frequency hopping energies are index values corresponding to a plurality of post-FFT digits in the N symbol groups, and the processor is configured to accumulate the frequency hopping energies, calculate the accumulated frequency hopping energies to generate an average energy of one symbol group, and calculate the average energy with a false alarm rate to generate a threshold, wherein the threshold is applied to determine whether signals sending from the user equipment are noises.

2. The base station of claim 1, wherein the processor is configured to generate the threshold with an algorithm, wherein the algorithm is built on Neyman Pearson Lemma, wherein the average energy and the false alarm rate are inputs of the algorithm.

3. The base station of claim 1, wherein the processor is configured to build a first lookup table based on value of N and a power of noise value, wherein the first lookup table records a correlation between value of N and the threshold.

4. The base station of claim 3, wherein the processor is configured to build a second lookup table with a simulation, wherein the simulation is built on Monte Carlo simulation model, wherein the first lookup table and a channel attribute are inputs of the simulation, wherein the second lookup table records a SNR (Signal to Noise Ratio) value corresponding to a detection rate, and wherein the detection rate is tied to the value of N.

5. The base station of claim 4, wherein the processor is configured to calculate the SNR value with a plurality of environmental parameters to generate an adjusted SNR value.

6. The base station of claim 5, wherein the processor is configured to search the adjusted SNR in the first lookup table and the second lookup table for determining a first length of the frequency hopping preamble sequence, wherein the first length of the frequency hopping preamble sequence is corresponding to a signal coverage.

7. The base station of claim 6, wherein the processor is configured to send the first length of the frequency hopping preamble sequence to the user equipment.

8. The base station of claim 6, wherein the processor is configured to reduce the first length of the frequency hopping preamble sequence when a number of the user equipment connected to the base station exceeds a workload limit.

9. The base station of claim 8, wherein the processor is configured to connect to an adjacent base station via the communicating element, wherein the processor is configured to control the adjacent base station to increase a second length of the frequency hopping preamble sequence corresponding to the adjacent base station.

10. A method for operating a base station, applied on a network of Internet of Things, wherein the method comprises:
- receiving, by a communicating element, a frequency hopping preamble sequence from a user equipment in the network;
- obtaining, by a processor, frequency hopping energies corresponding to N symbol groups from the frequency hopping preamble sequence, wherein N is a length of the frequency hopping preamble sequence, and the frequency hopping energies are index values corresponding to a plurality of post-FFT digits in the N symbol groups;
- accumulating, by the processor, the frequency hopping energies to calculate an average energy corresponding to one symbol group according to the accumulated frequency hopping energies; and
- calculating, by the processor, a threshold based on the average energy and a false alarm rate, wherein the threshold is applied to determine whether signals sending from the user equipment are noises.

11. The method of claim 10, wherein the step of calculating the threshold comprises:
- generating, by the processor, the threshold with an algorithm, wherein the algorithm is built on Neyman Pearson Lemma, wherein the average energy and the false alarm rate are inputs of the algorithm.

12. The method of claim 10, further comprising:
- building, by the processor, a first lookup table based on value of N and a power of noise value, wherein the first lookup table records a correlation between value of N and the threshold.

13. The method of claim 12, further comprising:
- building, by the processor, a second lookup table with a simulation, wherein the simulation is built on Monte Carlo simulation model, wherein the first lookup table and a channel attribute are inputs of the simulation, wherein the second lookup table records a SNR (Signal to Noise Ratio) value corresponding to a detection rate, and wherein the detection rate is tied to the value of N.

14. The method of claim 13, further comprising:
- calculating, by the processor, the SNR value with a plurality environmental parameters to generate an adjusted SNR value.

15. The method of claim 14, further comprising:
- searching, by the processor, the adjusted SNR in the first lookup table and the second lookup table; and determining, by the processor, a first length of the frequency hopping preamble sequence, wherein the first length of the frequency hopping preamble sequence is corresponding to a signal coverage.

16. The method of claim 15, further comprising:
- sending, by the processor, the first length of the frequency hopping preamble sequence to the user equipment.

17. The method of claim 15, further comprising:
- reducing, by the processor, the first length of the frequency hopping preamble sequence when a number of user equipments connected to the base station exceeds a workload limit.

18. The method of claim 17, further comprising:
- connecting, by the processor, to an adjacent base station via the communicating element; and controlling, by the processor, the adjacent base station to increase a second length of the frequency hopping preamble sequence corresponding to the adjacent base station.

* * * * *